June 11, 1929.  D. E. HENNESSY  1,716,552
BAND FORMING MACHINE
Filed Feb. 14, 1924
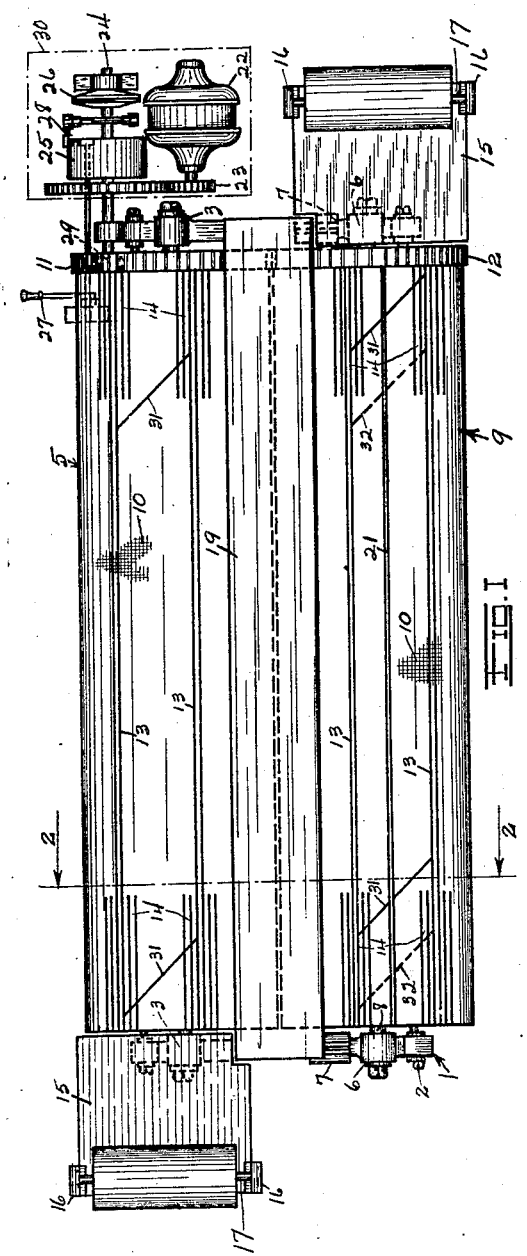
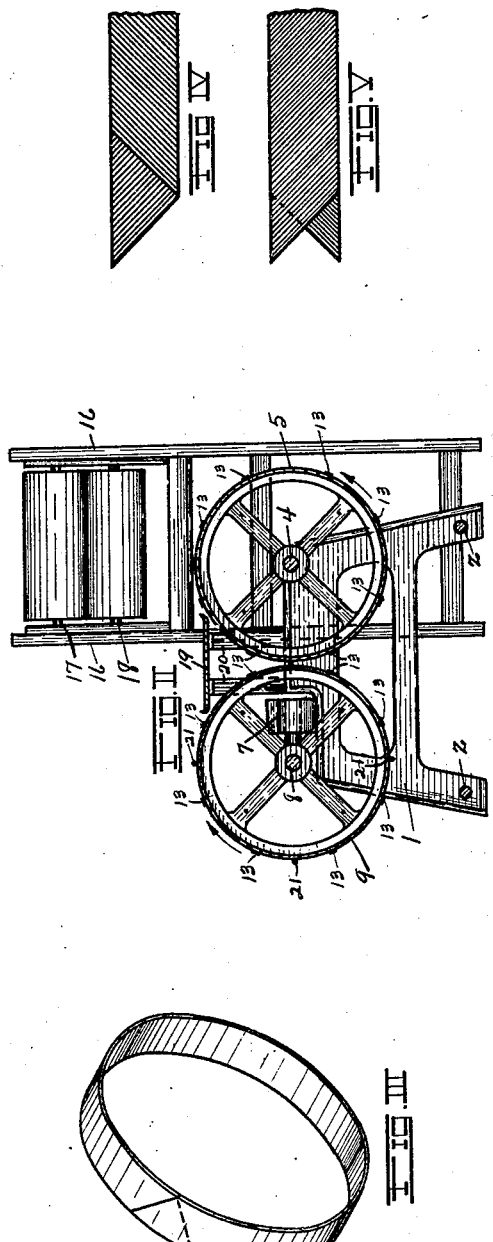
DANIEL E. HENNESSY
INVENTOR
BY Robert T. Harvey
ATTORNEY Patented June 11, 1929.

1,716,552

UNITED STATES PATENT OFFICE.

DANIEL E. HENNESSY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

BAND-FORMING MACHINE.

Application filed February 14, 1924. Serial No. 692,638.

In the manufacture of pneumatic tire casings the fabric which is to form the carcass of the casing is, according to one method of building, formed into an endless multi-ply band of the desired width and circumference prior to placing the fabric on the annular form upon which the casing is built and it is the object of my invention to provide a machine which will accurately and cheaply build up bands of this character. According to the customary practice the fabric, usually cord fabric is bias cut and the plies are laid with the strain resisting elements of the several plies crossing each other.

One embodiment of my invention is illustrated in the accompanying drawings in which Fig. I is a plan view;

Fig. II is a sectional elevation on the line 2—2 of Fig. I;

Fig. III is a perspective view of a complete pocket;

Figs. IV and V show alternative forms of splices.

In the drawings 1 designates the main frame of the machine which may be braced with suitable tie rods as shown at 2. Bearings are provided at 3 for a shaft 4 carrying a roll 5. Bearings 6 adjustably mounted at 7 on frame 1 support a shaft 8 carrying a second roll 9. Adjustable bearings 6 permit the pressure exerted by the rolls to be regulated as desired. The rolls 5 and 9 are preferably covered with canvas or other suitable material shown diagrammatically at 10. Intermeshing gears 11 and 12 are mounted respectively on shafts 4 and 8 to secure simultaneous rotation of the rolls. Suitable guides 13 are provided on the rolls. These guides may be in the form of adhesive tapes, and the rolls are preferably provided with ruled indications 14 by means of which the guides 13 may be positioned for different sizes of pockets. The guides are so positioned that when a ply of fabric is placed between the guides on each roll and the rolls rotated as shown by the arrows in Fig. II the plies will be superimposed one on the other. The fabric being rubberized adheres together and means are provided to positively retain the plied band on one of the rolls. Any suitable means may be employed for this purpose but preferably the canvas cover of roll 9 is coated with latex which renders it sufficiently tacky so that the ply of fabric placed on said roll adheres thereto sufficiently to strip the ply from roll 5 as the plies are rolled together. The latex however is not sufficiently adhesive to prevent the operator from easily stripping the plied band from the roll. Each roll is provided with as many sets of guides 13 as the width of the pockets and the circumference of the roll permit. Four sets are shown in the drawings.

Marks such as shown at 31 are placed on the rolls to show the proper length of fabric and position of the ends.

A suitable table 15 is placed at one end of each roll. These tables are supported by main frame 1 and standards 16. The standards 16 are extended to form supports for spindles 17 and 18 the former carrying a supply of band material rolled in a fabric liner which is wound on spindle 18 as the pocket material is withdrawn.

A guard 19 is provided to overlie the bight of the rolls. Said guard is carried by standards 20 mounted on frame 1 and may serve also as a table for the convenience of the operators.

In certain instances it is desirable to mark the pockets with an indication along their longitudinal center and for this purpose roll 9 may be provided with wires 21 properly positioned between guides 13. As the rolls press the pocket plies together wires 21 indent the rubberized surface sufficiently to give the desired indication without injury to the body of the fabric.

Rolls 5 and 9 may be rotated by any suitable means. In the illustration shown, a motor 22 drives, through a suitable chain of gears indicated at 23, a shaft 24. The power is transmitted to shaft 24 through a friction clutch, indicated at 25 and which operates in conjunction with a friction brake 26. The clutch is operated from lever 27 by linkage 28 in any suitable manner. Shaft 24 carries a pinion 29 meshing with gear 11 on shaft 2. The clutch and motor are preferably enclosed in a housing 30. The specific form of motor, clutch and operating connection are immaterial and further description thereof is unnecessary.

The operation of my machine is as follows: Fabric is drawn from the stock rolls along tables 15 and onto the rolls 5 and 9 and positioned thereon by the aid of guides 13. If necessary the fabric is spliced to the proper length on the rolls 5 and 9. When the fabric is positioned the rolls are rotated an amount sufficient to bring a second set of guides 13 into position, at the same time rolling the previously positioned plies together, and the operation is then repeated. The plied strips are removed from roll 9, as the progressive rotation of the rolls bring them around to the original position. The ends of the band are then spliced together to form the complete pocket as shown in Fig. III. It will be obvious that bands of any desired number of plies may be built up by letting the previously plied fabric strips remain on roll 9, the band picking up another ply from roll 5 at each complete revolution of the rolls. With the plies placed on the roll in the position shown by lines 31 in Fig. I, the ends to be spliced will be in the form shown in Fig. IV. If, however, the ply on roll 9 is moved to the relative position shown at 32 a "fish tail" end is produced as shown in Fig. V.

It will be understood that the specific form of my device above disclosed is illustrative only and my invention is not confined thereto.

What I claim is:

1. A device of the character described comprising cooperating rolls, adapted to support fabric strips in registering position, means to rotate said rolls to apply said strips one upon the other and means to positively retain the multi-ply strip, so formed, upon one of said rolls.

2. A device of the character described comprising cooperating rolls, guides thereon adapted to position fabric strips on said rolls means to rotate said rolls to apply said strips one upon the other and means to positively retain the multi-ply strip, so formed, upon one of said rolls.

3. A device of the character described comprising cooperating rolls, guides thereon adapted to position fabric strips on said rolls means to supply fabric to said rolls, marking means on one of said rolls, means to rotate said rolls to apply said strips one upon the other, and means to positively retain the multi-ply strips so formed, upon one of said rolls.

4. A device of the character described comprising co-operating rolls, adapted to support fabric strips in registering position, means to rotate said rolls to apply said strips one upon the other and means, comprising a coating of latex, to positively retain the multi-ply strip, so formed, upon one of said rolls.

5. A device of the character described comprising a pair of rolls adapted to support fabric strips in registering position, guides on said rolls and supports for a supply of fabric positioned at one end of each roll.

6. A device of the character described comprising a pair of rolls adapted to support fabric strips in registering position, guides on said rolls, supports for a supply of fabric positioned at one end of each roll and a guard plate bridging the bight of said rolls and forming a table.

In testimony whereof I have signed my name to the above specification.

DANIEL E. HENNESSY.